UNITED STATES PATENT OFFICE.

JAMES M. BROOKFIELD, OF BROOKLYN, NEW YORK.

IMPROVEMENT IN PROCESSES OF ANNEALING GLASS.

Specification forming part of Letters Patent No. 170,339, dated November 23, 1875; application filed November 3, 1875.

*To all whom it may concern:*

Be it known that I, JAMES M. BROOKFIELD, of Brooklyn, in the county of Kings and State of New York, have invented a new and useful Improvement in Annealing Glass, which improvement is fully set forth in the following specification:

This invention consists in the process of annealing articles of glass by plunging the same while in a heated state into a bath of melted metal or alloy of metals, which is, by preference, heated to a temperature of from 600° to 900° Fahrenheit, whereby the properties of the glass are entirely changed, and its power of resistance against blows or against sudden changes of temperature is materially increased.

In carrying out my invention I take the glass either directly from the furnace or mold, or I reheat the same after having been blown or molded, and plunge it in a bath of melted metal, such as zinc, lead, or tin, or in a bath of an alloy of tin and lead, tin and antimony, or any other alloy which will melt at a temperature of 500° Fahrenheit, or less, said bath being, by preference, heated to a temperature of from 600° to 900° Fahrenheit. In this bath I leave the glass for a few minutes, and after removing it from said bath I leave it to cool in the open air, or, if desired, the glass may be gradually cooled in an ordinary annealing-oven.

The effect of the metal bath on the glass is best when the glass, before being plunged into said bath, has been heated to the highest possible degree which the same will stand without getting out of shape. The temperature of the metallic bath is regulated according to the nature of the glass and to the shape of the articles made from said glass, and also according to the effect which it is desired to produce on the glass.

If it is desired to impart to the glass particularly the property to resist sudden changes of temperature, the metallic bath ought to be heated to a temperature of 900° or more, and kept at that temperature as near as practicable.

It will be readily seen that by using a metallic bath in this process of annealing glass a wide range of temperature is rendered feasible, and the temperature of the bath can be easily so regulated that it will produce the best possible effect.

I do not claim as my invention the process of tempering glass consisting in the immersion of the hot glass in a bath of oils, grease, wax, resinous or bituminous substances, the boiling-point of which is above the boiling-point of water, since this process is already known.

What I claim as new, and desire to secure by Letters Patent, is—

The within-described process for annealing glass, consisting in the immersion of the hot glass in a bath of melted meltal or alloy of metal, substantially as set forth.

In testimony that I claim the foregoing I have hereunto set my hand and seal this 1st day of November, 1875.

J. M. BROOKFIELD. [L. S.]

Witnesses:
    W. HAUFF,
    E. F. KASTENHUBER.